G. ROBERTSON.
ARTIFICIAL TROLLING BAIT.
APPLICATION FILED JULY 22, 1920.
1,376,230. Patented Apr. 26, 1921.
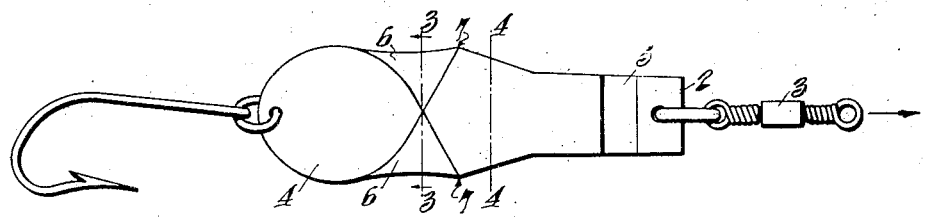
Fig. 1.
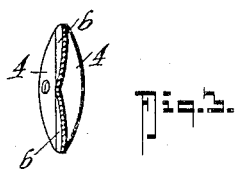
Fig. 3.
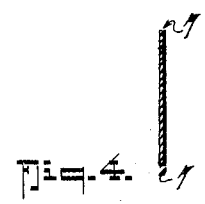
Fig. 4.
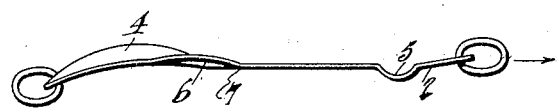
Fig. 2.
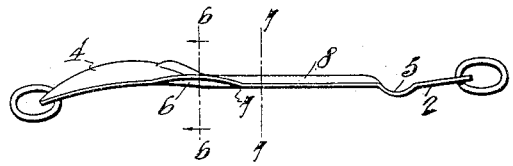
Fig. 5.
Fig. 7.
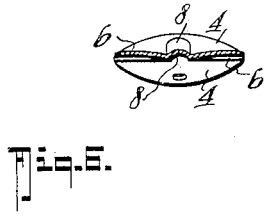
Fig. 6.
Inventor
Gilbert Robertson.
By Fred G. Dieterich
Attorneys

UNITED STATES PATENT OFFICE.

GILBERT ROBERTSON, OF VANCOUVER, BRITISH COLUMBIA, CANADA.

ARTIFICIAL TROLLING-BAIT.

1,376,230. Specification of Letters Patent. Patented Apr. 26, 1921.

Application filed July 22, 1920. Serial No. 398,057.

*To all whom it may concern:*

Be it known that I, GILBERT ROBERTSON, citizen of the Dominion of Canada, residing at Vancouver, in the Province of British Columbia, Canada, have invented certain new and useful Improvements in Artificial Trolling-Baits, of which the following is a specification.

This invention relates to an artificial trolling fish bait of that class known on the Pacific Coast as a "wobbler".

In the majority of these baits of the "wobbler" class, the bait maintains a substantially upright position on its edge and has a sinuous side to side movement imparted to it during trolling, by the ends of the bait being turned to opposite sides.

For certain conditions of the weather and water, side to side movement as obtainable is too long and the object in the design of this bait is to impart a quicker or more abrupt turning, and a shorter flight in any one direction.

These objects are attained by a relatively short length of bait with a larger area adjacent its midlength, and with a square leading end on which the water will act quickly to reverse the direction when the trolling pull on the line diverts it from the direction it is following.

There are several other features of improvement all tending to produce the desired result to which attention will be drawn in the following specification, reference being made to the drawings by which it is accompanied, in which:

Figure 1 is a side elevation or face view of the bait.

Fig. 2, an edge view of the same.

Fig. 3, a vertical cross section on the line 3—3 in Fig. 1.

Fig. 4, a vertical cross section on the line 4—4 in Fig. 1.

Fig. 5 is an edge view showing a modification, and

Figs. 6 and 7, cross sections on the lines 6 and 7 respectively in Fig. 1.

In these drawings 2 represents the leading end of the bait which is connected by a swivel 3 to the trolling line, and 4 is the spoon shaped after end to which the hook is connected. The leading end is square across, as shown in Fig. 1, and from there the bait is substantially parallel in width and is flat for a length approximately one-third that of the spoon.

Adjacent the square end 2 is a transverse groove 5 and from this groove the leading end is angularly offset slightly to the same side as the groove. From the end of the parallel portion to approximately the middle at 7 the width increases uniformly to about one and a half times that of the parallel portion, and therefrom reduces slightly to the edges of an oval spoon shape of intermediate width. The concave side of the spoon-shaped portion 4 is on the side opposite to the groove 5.

The after end of the spoon-shaped end 4, to which the hook is connected, is angled slightly from the plane of the intermediate portion to the side opposite that of the end 2.

The junction of the spoon-shaped depression 4 with the body of the spoon shows a well defined angle, the line of which is produced to each opposite side 7 and the spaces 6 between the junction of the spoon depression and the produced lines to 7 are hollowed slightly to the same side as the hollow of the spoon.

The construction of the bait is peculiar but the effect of it is to confer on it an erratic quick acting change of direction in its flight when trolled and particularly in strong tides.

The modification shown in Figs. 5, 6 and 7 comprises a medial groove 8 on the side to which the concavity of the spoon is directed, which groove extends from the transverse groove 5 to adjacent the bottom of the spoon-shaped depression 4. This groove is designed to impart rigidity to the flat intermediate portion and to maintain a side to side oscillation of the body of the spoon on either side of a vertical plane.

Having now particularly described my invention, I hereby declare that what I claim as new and desire to be protected in by Letters Patent, is:

1. A trolling bait, comprising an elongated body of thin sheet metal, one end to which the trolling line is connected being square across and substantially parallel in width therefrom toward the other end with a transverse groove adjacent the trolling line connection, the other end to which the hook is connected being spoon-shaped, the concavity of the spoon directed to the side opposite the groove.

2. A trolling bait, comprising an elongated body of thin sheet metal, one end to which the trolling line is connected, being square across and substantially parallel in width with a transverse groove adjacent the trolling line connection, the other end to which the hook is connected being relatively wider and spoon-shaped, the concavity of the spoon being on the side opposite the groove of the other end, the portion intermediate the parallel end and the spoon-shaped end being enlarged in width, and the square end beyond the transverse groove and the spoon end being angled slightly to opposite sides from the plane of the intermediate portion.

3. A trolling bait, comprising an elongated body of thin sheet metal, one end to which the trolling line is connected being square across and substantially parallel in width therefrom toward the other end with a transverse groove adjacent the trolling line connection, the other end to which the hook is connected being spoon-shaped the concavity of the spoon directed to the side opposite the groove, and a medial groove along the portion intermediate the transverse groove and the spoon-shaped depression.

4. A trolling bait, comprising an elongated body of thin sheet metal, one end to which the trolling line is connected being square across and substantially parallel in width therefrom toward the other end with a transverse groove adjacent the trolling line connection, the other end to which the hook is connected being spoon-shaped the concavity of the spoon directed to the side opposite the groove, and a medial groove along the portion intermediate the transverse groove and the spoon-shaped depression, the groove being on the same side as the depression of the spoon.

5. A trolling spoon, comprising an elongated body of thin sheet metal, one end to which the trolling line is connected being square across and substantially parallel in width therefrom toward the other end, the other end to which the hook is connected being spoon-shaped, the portion intermediate the parallel and spoon-shaped ends being symmetrically increased in width and the square end and spoon-shaped end being angled slightly to opposite sides from the intermediate portion, the junction of the spoon shaped depression with the body of the bait showing well defined angles, the lines of which are produced to the opposite edges of the body at the widest part and the spaces between the spoon edges and the produced lines being hollowed to the same side as the depression of the spoon.

In testimony whereof I affix my signature.

GILBERT ROBERTSON.